(12) United States Patent
Schulz Van Endert

(10) Patent No.: US 7,964,152 B2
(45) Date of Patent: Jun. 21, 2011

(54) END REACTOR

(75) Inventor: Eike Schulz Van Endert, Berlin (DE)

(73) Assignee: Uhde Inventa-Fischer GmbH, Berlin (DE)

( * ) Notice: Subject to any disclaimer, the term of this patent is extended or adjusted under 35 U.S.C. 154(b) by 298 days.

(21) Appl. No.: 12/302,255

(22) PCT Filed: May 31, 2007

(86) PCT No.: PCT/EP2007/004836
§ 371 (c)(1),
(2), (4) Date: Dec. 15, 2008

(87) PCT Pub. No.: WO2007/140926
PCT Pub. Date: Dec. 13, 2007

(65) Prior Publication Data
US 2009/0234093 A1 Sep. 17, 2009

(30) Foreign Application Priority Data

Jun. 2, 2006 (DE) .................. 10 2006 025 943

(51) Int. Cl.
*B01J 19/18* (2006.01)
*B01J 19/20* (2006.01)
*C08G 63/00* (2006.01)

(52) U.S. Cl. ........ 422/135; 422/134; 422/136; 422/137; 528/308

(58) Field of Classification Search .................. 422/134, 422/135, 136, 137; 528/271, 308
See application file for complete search history.

(56) References Cited

U.S. PATENT DOCUMENTS

| 3,563,710 | A | 2/1971 | Dew et al. |
| 3,684,458 | A | 8/1972 | McMammon et al. |
| 5,055,273 | A | 10/1991 | Wilhelm et al. |
| 5,779,986 | A | 7/1998 | Schulz Van Endert et al. |
| 6,096,838 | A * | 8/2000 | Nakamoto et al. ............. 526/64 |
| 2002/0188091 | A1 | 12/2002 | Hucks et al. |
| 2003/0139543 | A1 | 7/2003 | Wilhelm et al. |

FOREIGN PATENT DOCUMENTS

| DE | 3743051 A1 | 6/1989 |
| DE | 4447422 A1 | 7/1996 |
| DE | 10001477 A1 | 8/2001 |
| DE | 102005003731 A1 | 7/2006 |
| EP | 0320586 A1 | 10/1988 |
| EP | 0719582 A2 | 7/1996 |
| EP | 1253163 A1 | 10/2002 |
| WO | WO94/20652 | 9/1994 |
| WO | WO2006/050799 | 5/2006 |

OTHER PUBLICATIONS

International Search Report/Written Opinion for PCT/EP2007/004836 completed Aug. 20, 2007.

* cited by examiner

*Primary Examiner* — Walter D Griffin
*Assistant Examiner* — Lessanework Seifu
(74) *Attorney, Agent, or Firm* — Barnes & Thornburg LLP

(57) ABSTRACT

The present invention relates to a reactor apparatus for free-flowing media, especially for polymers, for polycondensation of polyesters, comprising a rotor which rotates in a reactor casing having an inlet and outlet, said rotor being supported horizontally via a support apparatus by means of stub shaft arrangements which reach beyond the end walls of the reactor casing, wherein annular film-forming elements and, between the annular film-forming elements, strippers are arranged on the inner surfaces of the reactor casing on the rotor, such that the cylindrical rotor has at least one partly heated section.

20 Claims, 4 Drawing Sheets

END REACTOR

CROSS REFERENCE TO RELATED APPLICATIONS

Figure 1:
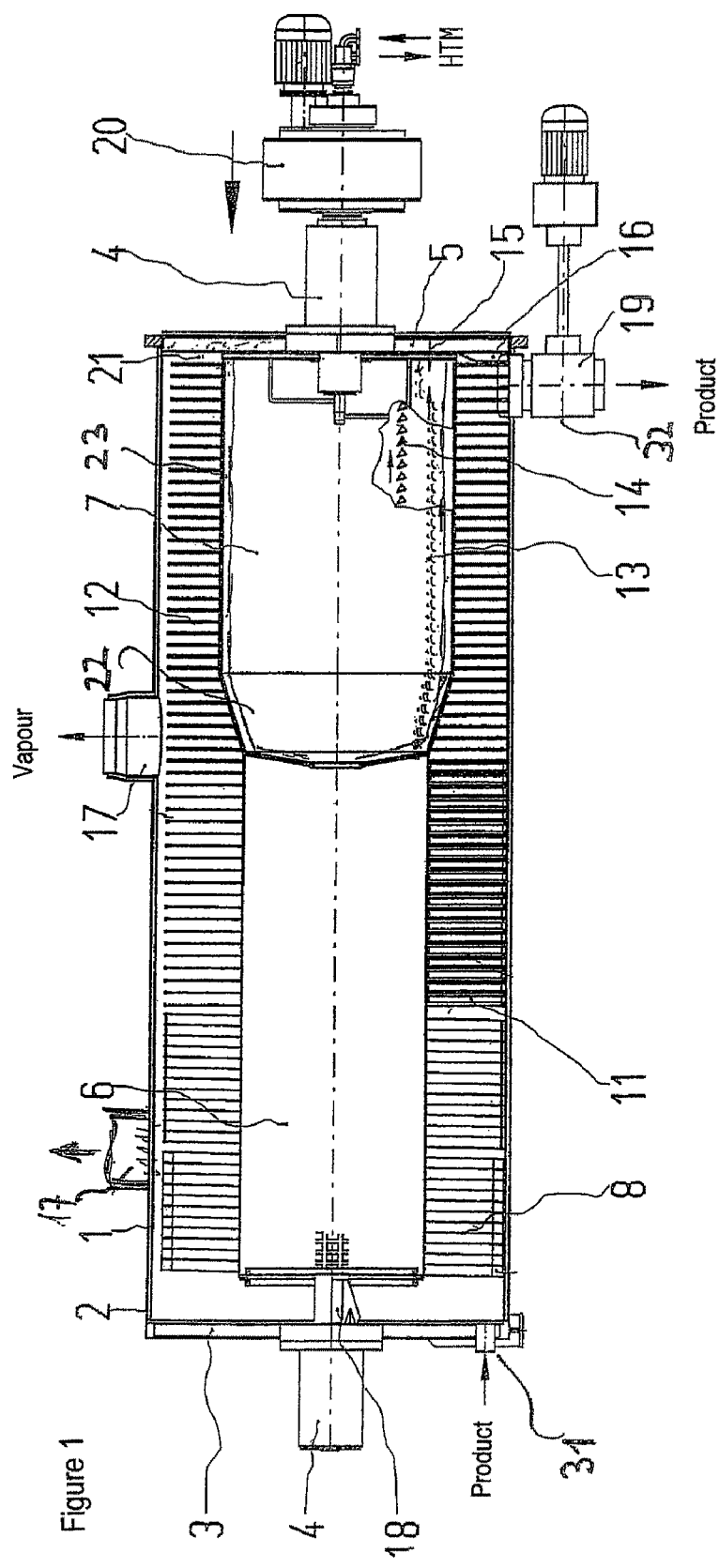

This application is the U. S. national phase of PCT/EP2007/004836 filed May 31, 2007. PCT/EP2007/004836 claims benefit under the Paris Convention to DE 10 2006 025 943.2 filed Jun. 2, 2006. The disclosures of both of DE 10 2006 025 943.2 and PCT/EP2007/004836 are hereby incorporated herein by reference. The invention relates to a reactor device for flowable media, in particular for polymers for the polycondensation of polyesters, according to the preamble of the main claim.

A device of this type is known from DE 44 47 422 A1. This reactor device comprises a reactor housing, which has an inlet and outlet, and a rotor which rotates therein and is mounted horizontally via a mounting device with vacuum-tight seals by means of stub shaft arrangements which extend beyond the end walls of the reactor housing, annular conveyer elements being provided on the rotor. The rotor thereby comprises a hollow cylinder provided with openings (perforated basket frame) on which the annular elements are then mounted.

Reactor devices, as described previously, are used in particular for the polycondensation of viscous monomers and/or prepolymers. However it has now been shown that it is not possible with a reactor device of this type to produce high-viscous polymer products with simple means at favourable plant costs and to achieve at the same time improved quality of the end products relative to the known systems.

Starting herefrom, it is therefore the object of the present invention to indicate a reactor device for flowable media, in particular for polymers for the polycondensation of polyesters, with which it is possible to produce, in a simple manner, high-viscous polymer products with excellent quality and also a defined dwell time spectrum in the reactor whilst achieving a high molecular weight at the same time. The reactor can be operated in the entire low pressure and high pressure range and also at temperatures up to 350° C.

This object is achieved according to the invention by the characterising features of the main claim in conjunction with the features of the preamble. The sub-claims reveal advantageous developments.

According to the invention, it is hence provided that the cylindrical rotor itself has an at least partially heatable or coolable portion. Due to the configuration of an at least partially heated or cooled portion of the cylindrical rotor, it is achieved that also high-viscous polymer products can be processed without so-called "dead spots" arising, which could lead to ultraviscous and high crystalline deposits which would reduce the quality of the end product.

The heating or cooling of the rotor can thereby be configured such that the rotor is completely heated or cooled or else that the rotor is divided into two portions, and in fact an unheated and a heatable/coolable portion which is disposed at the outlet side. The heatable/coolable portion is thereby designed such that it essentially covers the high-viscous region and the unheated portion the low-viscous region. According to the polymer, one to two thirds of the horizontally disposed rotor can therefore be formed by the heated portion which is disposed at the outlet side.

In the case where a continuously heated/cooled rotor is provided, it is favourable if a corresponding temperature gradient, starting from a low temperature at the inlet, i.e. in the low-viscous region, up to a higher temperature in the high-viscous region at the outlet, is produced by suitable measures.

Preferably, the reactor device is however constructed such that it has an unheated portion and an outlet-side heatable/coolable portion. The heatable/coolable portion is located in the high-viscous region and can comprise one to two thirds of the entire horizontal reactor with respect to the horizontal extension.

In the case of the reactor according to the invention, the unheated portion is thereby formed preferably by a perforated basket frame and the heatable/coolable portion by a closed frame. The closed frame provided in the high-viscous region is provided preferably in addition with heating which can be configured as a double jacket for heat transfer oils or electric radiation heating. The transition from the perforated to the unperforated basket frame is configured as a long cone which characterises the transition from the medium-viscous sump to the high-viscous almost sump-free operation.

The heating/cooling of the basket frame when choosing a liquid heat carrier is effected through the drive shaft by means of a leadthrough which is surrounded with insulation within the same. This avoids undesired heat transmission to bearings and seals of the agitator. The drive itself is configured as a slip-on gear mechanism with a torque converter bearing.

The ratio of perforated frame diameter to the reaction chamber diameter is according to the invention between 0.5 and 0.6 and the ratio of the closed frame to the reaction chamber 0.65 to 0.75. Furthermore, it has proved to be advantageous if the L/D ratio (length ratio L to diameter ratio D) of the reaction chamber is 1 to 3.5, preferably 1.5 to 3.0, particularly preferred 2.5 to 3.

A further characteristic of the present invention resides in the fact that the annular film-forming elements are configured as a tubular crown, a net-like metallic pipe structure with a different geometry being clamped between the tubular crown and the rotor surface. It has been shown that, contrary to previous experience, the construction of the surface-forming rings with a high-viscous polymer comprising rectangular profiles and spokes with round or polygonal (e.g. hexagonal) openings represents a solution which is not preferred. It is shown rather that round cross-sections (pipes) for the support construction assist the take-up of polymer and the formation of striations and films, the pipe construction making available triangular and/or lozenge-shaped openings in which the drawing for the film formation takes place. The openings can hereby be disposed on tubular involutes which produce the connection to the basket frame and ensure that an enlargement of the film surface is always effected due to the rotational movement of the basket. This arrangement also has the advantage that a gentle shearing (drawing cut) takes place at the strippers, as a result of which the energy input is significantly reduced.

Furthermore it is advantageous that, in contrast to rectangular profiles on the pipe rings, no stationary horizontal surfaces are formed on which the polymer can persist for a longer time, as a result of which it would lead to impairment in quality. On round cross-sections, the polymer surrounds the cross-section with the formation of films such that gravitation on the mass comes into effect. Consequently, the result is continuous material exchange and constant formation of particularly thin and stable product films which lead to rapid evaporation of mobile reactands or solvents.

The tubular film-forming elements are thereby disposed on the rotor perpendicular to the container axis.

As already known in the state of the art, a stripper is provided between each pair of tubular film-forming elements. However, it is preferred in the case of the reactor device according to the invention if, in the region of the unheated portion, i.e. in the region of the perforated basket frame, strippers (stators) are provided and, in the region of the heated/cooled portion, i.e. in the region of the closed frame, so-called conveyer strippers and counter-strippers are provided. The purpose of the strippers/conveyer strippers and counter-strippers resides in the fact that the polymer mass withdrawn from the sump through the tubular crown is delimited to the same and it is avoided at the same time that closed polymer bridges are produced in the intermediate space. Therefore, an arrangement of the strippers tangentially to the lower edge of the basket is preferred. A further purpose of the strippers/conveyer strippers and counter-strippers resides in the fact that the beads which form on the closed frame are pushed through the tubular crown and polymer beads which flow from the smooth basket frame wall are exchanged for thin layers, the mass being collected in the sump.

The conveyer strippers disposed between each pair of film-forming elements and the strippers disposed on the opposite side of the frame ensure at the same time that the beads and polymer mass which accumulate at the intermediate space between two tubular crowns are pushed through the next disc in the flow direction and thereby effect self-cleaning of the pipe rings at the connection points to the frame and simultaneously reloading of the same. The strippers are configured in the form of triangular cross-sections with a different positioning of one side relative to the horizontal. As a result, the conveyer effect is produced.

A further characteristic of the reactor device according to the invention resides in the fact that the heatable/coolable basket frame is guided at a small spacing up to the reactor end cover. At the periphery of the basket frame, a resilient circumferential blade stripper element is disposed which avoids contamination of the end cover. The intermediate space can thereby be purged with an inert gas.

In the region at the discharge, a crescent moon-shaped displacer is preferably disposed in addition, which displacer ensures a dead space-free transition to the pump suction opening and is positioned at a specific angle following the polymer sump. For optimum final degassing of the polymer, one or more annular film-forming elements are provided in front of the displacer and, in conjunction with recirculating strippers, likewise ensure a supply of polymer to the pump.

In the case of the reactor device according to the invention, it must be emphasised furthermore that it is favourable if the polymer outlet connection piece has a rectangular configuration, the longer sides being disposed at right angles to the container axis so that product supplied by the strippers effects optimum filling of the discharge gear pump. The polymer outlet connection piece is preferably a rectangular block flange which forms a connection to the heating jacket thereof in the container wall, which is disposed, not in the normal manner perpendicular to the central axis of the container, but displaced parallel in the direction of rotation of the basket. As a result, the constant, complete filling of the gear pump is ensured in addition.

In the case of the reactor device according to the invention, also the arrangement of the gas vacuum pipe (vapour connection piece) at a longitudinal position of the reactor in the upper region is furthermore advantageous. The arrangement of the pipe just before the high-viscous zone has been shown to be particularly favourable, e.g. after approx. 60% of the reactor length. In order to avoid turbulence of the gas flow at the transition point to the pipe, a transition reduction in the cross-section ratio 2 to 3:1 is preferred, an inclination from the upper central line of the container of 10° to 30° in the direction of rotation of the basket being particularly favourable. Also a further vapour pipe can be provided in the first third of the housing in order to remove the main mass of the solvent or reaction gas advantageously before the high-viscous part of the reactor.

The invention relates furthermore to the use of the above-described device for the polycondensation of polymers, preferably polyesters. The device according to the invention can be used furthermore preferably as a so-called end reactor in polycondensation processes.

Figure 2:
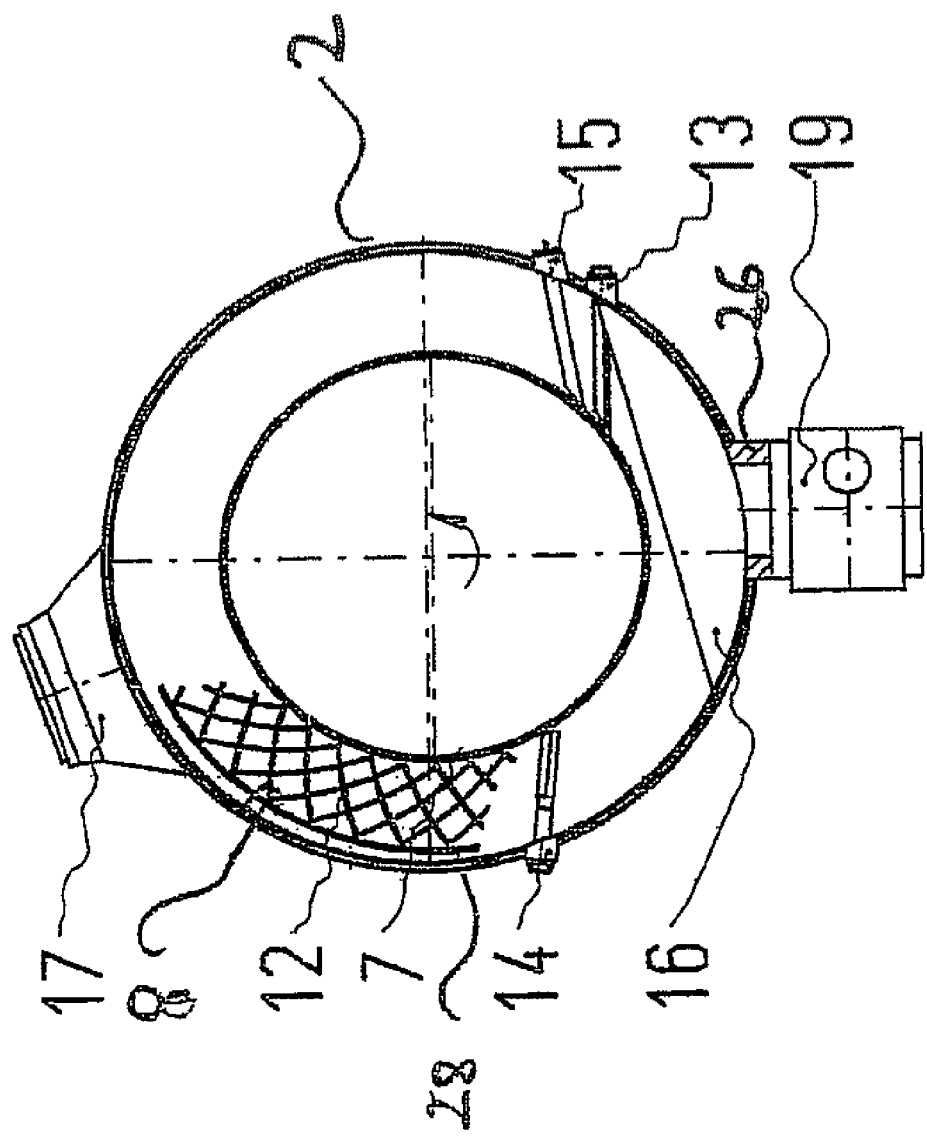
Figure 3:
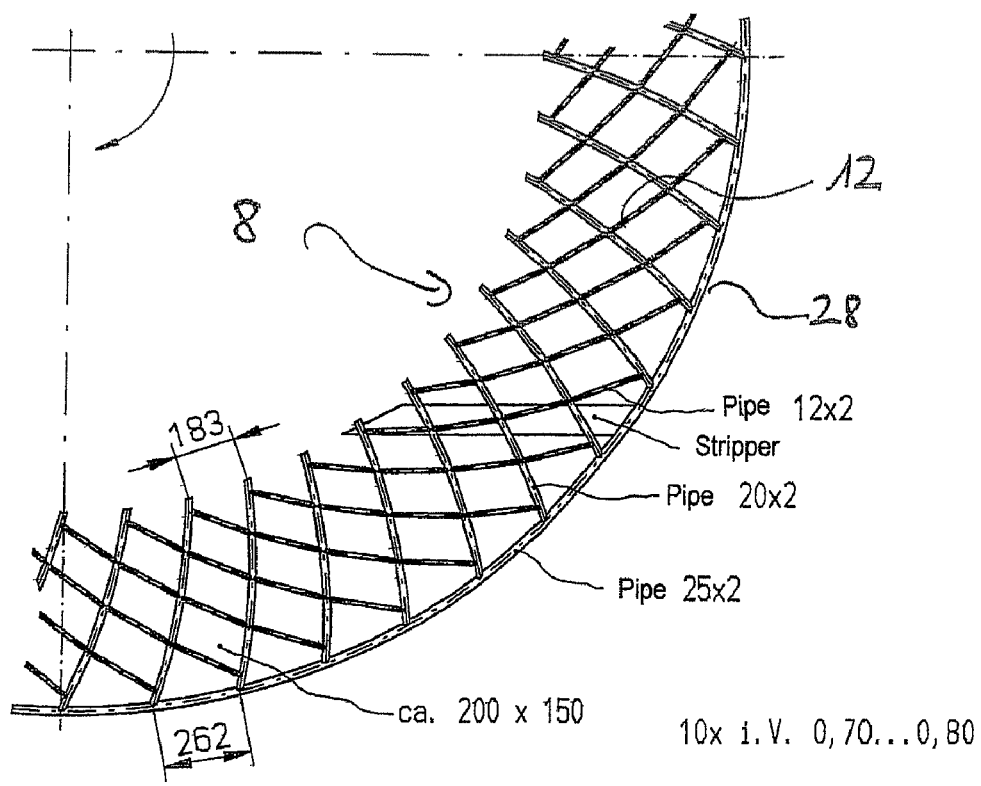

The invention is explained subsequently in more detail with reference to FIGS. 1 to 4 without however restricting the subject of the present invention. There are hereby shown:

FIG. 1 a longitudinal section through a reactor device according to the invention;

FIG. 2 a cross-section through the reactor device;

FIG. 3 the configuration of the annular film-forming elements and

Figure 4:
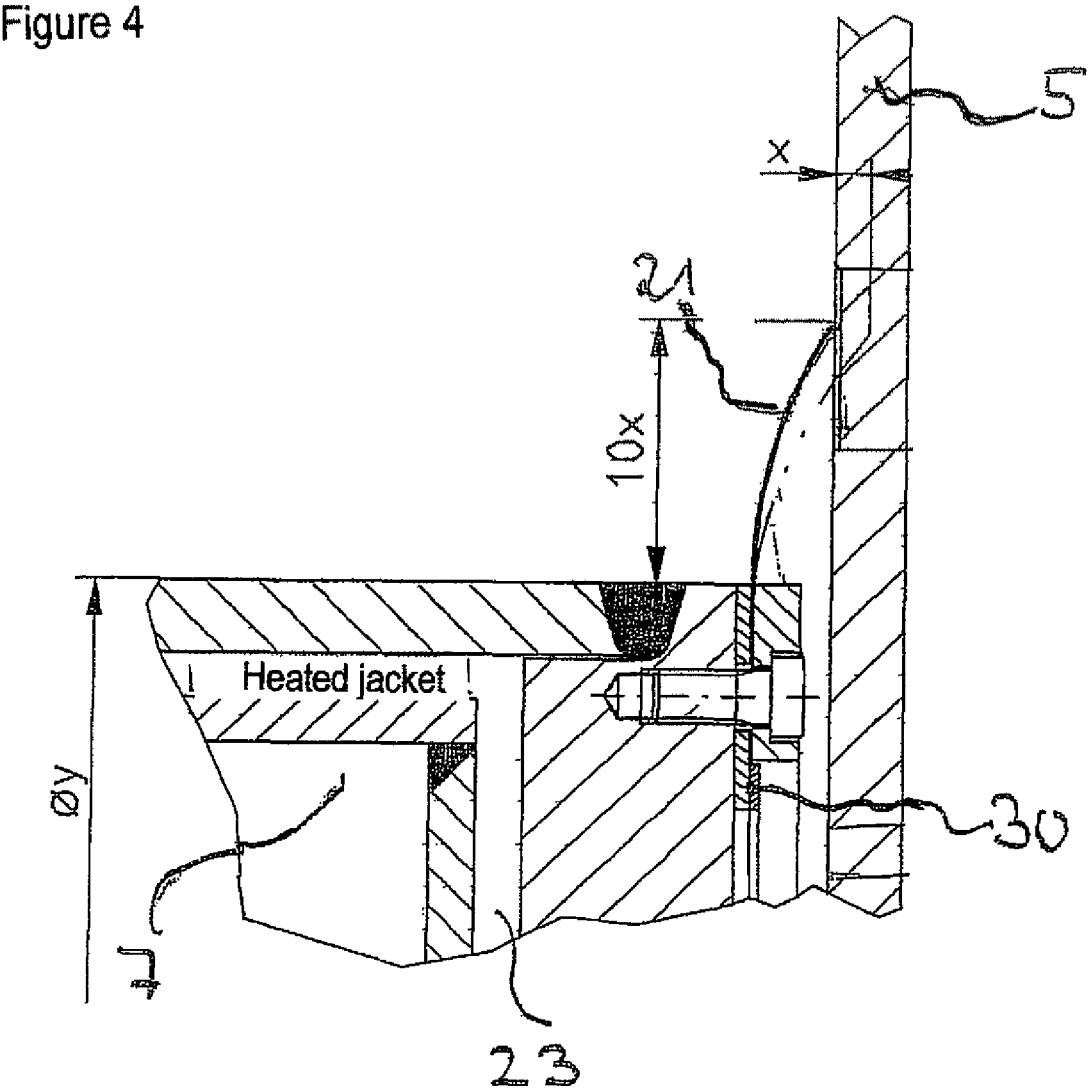

FIG. 4 a partial view of the end cover construction.

FIG. 1 shows an embodiment of a reactor device according to the invention in longitudinal section. The reactor device comprises a reactor housing 1 which has a heated double jacket 2. The reactor housing is provided, on the inlet side, with a cover with a heating jacket 3 and, on the outlet side, with an end cover 5 with a welded lip. A rotating rotor is mounted horizontally thereby in the reactor via mounting devices with a vacuum-tight seal 4 by means of stub shaft arrangements which extend beyond the end walls of the reactor housing 1 which form the covers 3, 5. In the embodiment according to FIG. 1, the horizontally mounted rotating rotor is thereby formed by a perforated agitated basket frame 6 and a closed heated agitated basket frame 7, the transition from the perforated to the unperforated basket frame being configured as a long cone 22. The advantage of the configuration of the rotor according to the invention in the form of a heated portion as a closed frame 7 and of the unheated portion as a perforated basket frame 6 now resides in the fact that the production of high-viscous polymer products with high molecular weights is able to be achieved in a reactor, e.g. polyesters with outstanding purity. Due to the transition from the perforated to the unperforated basket frame in the form of a long cone 22, the transition from the medium-viscous sump to the high-viscous, almost sump-free operation is assisted.

The heating of the closed agitated basket frame 7 is produced, according to the embodiment according to FIG. 1, by a double jacket 23.

The annular film-forming elements 8 which are mounted on the rotatable rotor 6, 7 are formed by a tubular crown 28 and a net-like metallic pipe structure 12 which is clamped between the tubular crown 28 and the rotor surface. The exact configuration of the annular film-forming elements 8 is shown in FIG. 2.

A further characteristic of the reactor device according to the invention now resides in the fact that strippers, conveyor strippers and/or counter-strippers 11, 13, 14, 15 are disposed between each pair of annular film-forming elements. In the case of the example of the embodiment according to FIG. 1, in the region of the unheated portion 6, i.e. in the region of the perforated agitated basket frame which is defined essentially by the low-viscous region, blade strippers 11 are provided. In the region of the heated portion which is defined essentially by a high-viscous operation, conveyor strippers 13 with a triangular profile and/or support wing profile and counter-strippers 14 which likewise have a triangular profile are provided. Due to this specific configuration of the different arrangement and configuration of the strippers, conveyor strippers and/or counter-strippers 11, 13, 14, 15, an almost optimum film formation and self-cleaning is achieved. In order further to assist an optimum film formation, it is likewise also provided in the embodiment of the reactor device according to FIG. 1 that a shaft stub stripper 18 is provided at the inlet side and resilient blades 21 at the outlet side. In the case of the reactor device according to the invention, it must be stressed in addition that, due to the arrangement of the annular film-forming elements 8 up to the end cover 5, an optimum degassing can be achieved. Hence polymer end products can be produced which have low contents of undesired by-products and also in particular low acetaldehyde contents in the case of polyesters. The discharge of the produced gases is effected in the reactor device via at least one vapor connection piece 17, but preferably, as shown in FIG. 1, via two vapor connection pieces 17. As a further characteristic of the reactor device according to the invention, it must be mentioned that the discharge pump 19 is integrated directly in the reactor housing 1. The polymer outlet connection piece assigned to the discharge pump 19 is thereby preferably a rectangular block flange which is integrated directly in the heating jacket 2, this being effected not as normally perpendicular to the central axis of the container but displaced parallel in the direction of rotation of the basket (see also FIG. 2). As a result, as complete as possible suctioning away of the product is achieved since the latter accumulates respectively always in the direction of rotation out with the horizontal of the basket. For further assistance, in the reactor device according to the invention, an end cover displacer 16 is also provided in addition on the end cover so that optimum supply of the high-viscous polymer into the discharge pump 19 can be effected and a dead space avoided. In FIG. 1, the drive transmission or the motor for the horizontal basket disposed in the housing 2 is thereby designated with 20.

In FIG. 2, a cross-section of the reactor described in FIG. 1 is now shown. The parallel displacement in particular, in the direction of rotation, of the discharge pump 19 emerges from FIG. 2 and the integration of a rectangular block flange 26 in the housing 1. Furthermore, the arrangement of the conveyor strippers 13 and also counter-strippers 14 respectively with a triangular profile emerges from FIG. 2. The conveyor strippers in the counter-flow are designated with 15. FIG. 2 likewise shows, in sections, the arrangement of the annular film-forming element 8 on the closed heated agitated basket frame 7. The annular film-forming element 8 thereby comprises a tubular crown 28 and also pipe rings with pipe involutes and lozenges 12. The vapor or vacuum pipe is represented again with 17 as in FIG. 1, the reference number 16 designates the end cover displacer.

The precise construction of the annular film-forming elements 8 is now shown in FIG. 3. In FIG. 3, the film-forming element 8 is thereby represented in section without the rotor. The annular film-forming element 8 thereby comprises a tubular crown 28 and also pipe rings with pipe involutes and lozenges 12. It has been shown that in particular round cross-sections, such as pipes, for the support construction assist the take-up of polymer and the striation- and film-formation, the pipe construction, as can be detected in FIG. 3, making available triangular or lozenge-shaped openings in which the drawing for the film formation takes place. The openings can hereby be disposed on tubular involutes which produce the connection to the basket frame and ensure that an enlargement of the film surface is always effected due to the rotational movement of the basket. This arrangement also has the advantage that gentle shearing (drawing cut) takes place at the strippers, as a result of which the energy feed is significantly reduced. From FIG. 3, also the corresponding dimensions of the pipes and of the involutes and triangular cut-outs are shown in addition. The dimensions of the involutes or lozenges is chosen as a function of the polymer to be produced and the viscosity thereof. In the case of high-viscous polymers, a corresponding enlargement is chosen, whereas the dimensions shown in FIG. 3 are favourable with low-viscous products.

FIG. 4 now shows again in enlarged representation a cut-out from the end cover construction 5 of the reactor device according to the invention according to FIG. 1. As emerges from FIG. 4, the embodiment according to FIG. 1 has a resilient stripper 21 which is mounted with the heated jacket 23 of the closed basket frame 7 for example via screws, in addition also a spot weld 30 can be present. The resilient stripper 21 which is configured in the form of blades ensures that contamination of the end cover with product is prevented. In addition, it is also provided that the space delimited by the resilient stripper 21 and by the end cover 5 can be purged by means of inert gas.

The invention claimed is:

1. A reactor device for polymers for the polycondensation of polyesters, the reactor having a reactor housing including inner faces, end walls and a mounting device, a cylindrical rotor which rotates in the reactor housing, the reactor having an inlet and an outlet, the reactor including stub shaft arrangements extending beyond the end walls for mounting the reactor horizontally via the mounting device, annular film-forming elements disposed on the rotor, strippers disposed between the annular film-forming elements on the inner faces of the reactor housing, the cylindrical rotor having a portion which is at least one of heatable and coolable, the portion which is at least one of heatable and coolable being provided in the direction of the outlet, and an unheated portion being provided in the direction of the inlet, the unheated portion of the cylindrical rotor being configured as a perforated basket frame and the portion which is at least one of heatable and coolable being configured as a closed frame.

2. The reactor device according to claim 1 wherein the ratio of perforated basket frame diameter to the reaction chamber diameter is between about 0.5 and about 0.6 and the ratio of the closed frame to the reaction chamber is between about 0.65 and about 0.75.

3. The reactor device according to claim 1 wherein the ratio L/D of the length (L) to the diameter (D) of the reaction chamber is between about 1 and about 3.5.

4. The reactor device according to claim 1 wherein the closed frame has a double jacket which is at least one of heatable and coolable.

5. The reactor device according to claim 1 wherein the transition from the perforated basket frame to the closed frame is configured as a cone.

6. The reactor device according to claim 1 wherein the portion which is at least one of heatable and coolable comprises about one third to about two thirds of the rotor.

7. The reactor device according to claim 1 wherein the strippers are disposed only in a portion of the rotor which is not at least one of heatable and coolable and the reactor further comprises conveyer strippers in the portion of the rotor which is at least one of heatable and coolable.

8. The reactor device according to claim 7 wherein the conveyer strippers are radially offset relative to the strippers which are disposed in the region of the unheated portion.

9. The reactor device according to claim 7 further comprising counter-strippers in the region of the portion which is at least one of heatable and coolable opposite the conveyer stripper.

10. The reactor device according to claim 7 wherein at least one of the conveyer strippers and the counter-strippers has a triangular configuration.

11. The reactor device according to claim 1 wherein the annular film-forming elements comprise a tubular crown and a net-like metallic pipe structure clamped between the tubular crown and the rotor surface.

12. The reactor device according to claim 11 wherein the net-like metallic structure forms at least one of lozenge-shaped openings and triangular openings.

13. The reactor device according to claim 1 further comprising a discharge pump disposed on the reactor housing.

14. The reactor device according to claim 1 wherein the reactor housing has a heatable double jacket.

15. The reactor device according to claim 1 further comprising an end cover displacer adjacent the outlet.

16. The reactor device according to claim 1 further comprising a seal comprising resilient blades between the housing end wall and the frame which is at least one of heatable and coolable.

17. The reactor device according to claim 1 further comprising at least one vapor pipe for the reaction gases, the at least one vapor pipe connected by a cone at a surface ratio of between about 2 : 1 and about 3 : 1.

18. The reactor device according to claim 17 wherein the vapor pipes are disposed at angles between about 0° and about 30° from perpendicular to the container axis.

19. A method for the polycondensation of polyester comprising charging a reactor with prepolymer, the reactor having a reactor housing including inner faces, end walls and a mounting device, a cylindrical rotor which rotates in the reactor housing, the reactor having an inlet and an outlet, the reactor including stub shaft arrangements extending beyond the end walls for mounting the reactor horizontally via the mounting device, annular film-forming elements disposed on the rotor, strippers disposed between the annular film-forming elements on the inner faces of the reactor housing, the cylindrical rotor having a portion which is at least one of heatable and coolable, the portion which is at least one of heatable and coolable being provided in the direction of the outlet, and an unheated portion being provided in the direction of the inlet, the unheated portion of the cylindrical rotor being configured as a perforated basket frame and the portion which is at least one of heatable and coolable being configured as a closed frame, and operating the reactor to produce polyester.

20. The method of claim 19 wherein the reactor comprises an end reactor.

\* \* \* \* \*